United States Patent Office 2,830,043
Patented Apr. 8, 1958

2,830,043

MONOAZO DYESTUFFS

Ernst Merian, Allschwil, near Basel, Switzerland, assignor, by mesne assignments, to Saul & Co., Newark, N. J., as nominee of Fidelity Union Trust Company, executive trustee under Sandoz Trust No Drawing. Application December 21, 1953
Serial No. 399,610

Claims priority, application Switzerland
December 24, 1952

6 Claims. (Cl. 260—207.5)

The present invention relates to new monoazo dyestuffs which dye acetate silk fibers, synthetic polyamide fibers and polyester fibers in pure ruby, violet, blue and reddish brown shades, the dyeings of which are distinguished by excellent discharge properties and very good fastness to light, washing, perspiration and sublimation. Amongst the new monoazo dyestuffs those which dye acetate silk fibers in violet and blue shades, find a particular interest as, until now, neither violet nor blue dyestuffs of the dispersion type are known, the dyeings of which are well dischargeable and have simultaneously a good fastness to light.

The new monoazo dyestuffs of the present invention correspond to the formula

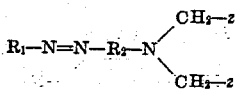

wherein $R_1$ stands for a benzene radical which bears in position 2 a sulfonic acid fluoride group, in position 4 a nitro group and in position 6 a hydrogen or a halogen atom or a lower alkyl, a trifluoromethyl or a lower alkoxy group, $R_2$ stands for a benzene radical, z stands for a hydrogen atom or a lower alkyl, a lower hydroxyalkyl, a lower alkoxyalkyl, a cyano, a lower cyanoalkyl, a lower difluoroalkyl, a lower polyfluoroalkyl, a lower alkoyl, a lower alkoylalkyl, a lower alkylsulfonyl, a lower alkylsulfonylalkyl, a lower carbamidealkyl, a lower carboalkoxyalkyl or a lower alkoyloxyalkyl group, and wherein the group

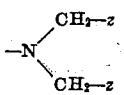

is present in position para to —N=N—.

A preferred series of the new monoazo dyestuffs has the formula

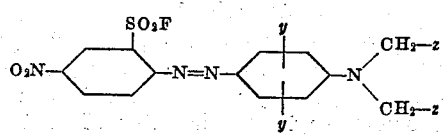

wherein y stands for a hydrogen or a halogen atom or a lower alkyl, a lower alkoxy, an acetylamino or a trifluoroacetylamino group, and wherein z stands for a hydrogen atom or a methyl, an ethyl, a propyl, a hydroxymethyl, a hydroxyethyl, a hydroxypropyl, a hydroxybutyl, a dihydroxyethyl, a methoxymethyl, a methoxyhydroxyethyl, a dimethoxyethyl, a cyano, a cyanomethyl, a difluoromethyl, a trifluoromethyl, a difluoroethyl, a trifluoroethyl, a tetrafluoroethyl, a pentafluoroethyl, an acetyl, a propionyl, an acetonyl, a methylsulfonyl, a methylsulfonylmethyl, an ethylsulfonylmethyl, a carbamidemethyl, a carbomethoxymethyl, a carboethoxymethyl, an acetoxymethyl or a propionoxymethyl group.

The new monoazo dyestuffs can be prepared by coupling 1 mol of the diazo compound of a 1-amino-4-nitrobenzene-2-sulfonic acid fluoride which may carry further substituents non-conferring water-solubility, with 1 mol of a tertiary amine of the benzene series which too may carry further substituents non-conferring water-solubility. Of special importance in carrying out the present invention are the diazo derivatives of the 1-amino-4-nitrobenzene-2-sulfonic acid fluorides which bear in position 6 a hydrogen, a fluorine, a chlorine or a bromine atom or a methyl, an ethyl, a trifluoromethyl, a methoxy or an ethoxy group. These intermediates are new. Their production is described in my copending application, Serial No. 399,609, filed on even date herewith, now U. S. Patent No. 2,794,833.

As azo components for the preparation of the monoazo dyestuffs according to the present invention use may be made of the most diverse tertiary amines of the benzene series which are free of groups conferring water-solubility, for example, the amines which correspond to the formula

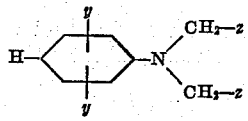

wherein y and z have the previously recited significances.

The coupling reaction of the diazo compounds with the azo components is carried out in the usual way, preferably in an acid medium. The dyestuffs thus prepared are filtered, washed and dried.

In order to obtain useful dyeing compositions, the obtained monoazo dyestuffs are preferably ground, if desired in the presence of inorganic and/or organic fillers, together with suitable dispersing agents. Valuable dyeing compositions can also be prepared by mixing the dyestuff pastes in the moist state with suitable dispersing agents and subsequently drying the mixture, for example, in an atomizing drier.

The following examples illustrate the invention without, however, being restrictive thereof. In the examples, the parts and percentages are by weight, and the temperatures are in degrees centigrade.

Example 1

7.6 parts of sodium nitrite are added in the course of 1 hour to 90 parts of concentrated sulfuric acid at 60°. The solution is cooled to 10–20° and then diluted with 100 parts of concentrated acetic acid, whereupon 22 parts of 1-amino-4-nitrobenzene-2-sulfonic acid fluoride are added at 10–15°. Then 100 parts of concentrated acetic acid are added dropwise, and the excess of nitrite is destroyed by means of 5 parts of urea. The diazo solution thus obtained is poured onto 250 parts of ice, and coupling is carried out with a mixture of 19 parts of N-hydroxyethyl-N-cyanoethyl-aminobenzene, 20 parts of 30% hydrochloric acid and 20 parts of ice. The formed monoazo dyestuff is filtered off, washed free of acid and dried. A dark red powder is obtained, which, when recrystallized from ethanol, forms bluish-red rectangular leaves with a melting point of 175–177°.

*Analyses.*—Carbon calcd. 48.45%; found 48.40%. Hydrogen calcd. 3.83%; found 4.05%.

The new monoazo dyestuff corresponds to the formula

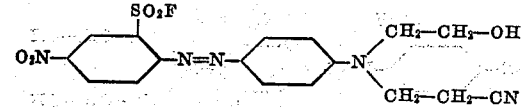

It dissolves in ethanol with a bluish red coloration and dyes acetate silk in well dischargeable ruby shades of excellent fastness to light, washing, perspiration, gas fumes and sublimation. The dyeings on synthetic polyamide fibers are somewhat more yellowish in shade and have also excellent fastness to washing, to perspiration, to gas fumes and to sublimation.

*Example 2*

44 parts of 1-amino-4-nitrobenzene-2-sulfonic acid fluoride are introduced into 350 parts of concentrated sulfuric acid. The solution thus obtained is heated up to 60° and 14 parts of sodium nitrite are added. When the diazotation is finished, the mass is poured onto 500 parts of water and 1000 parts of ice, while the temperature is kept below 5°. Coupling is carried out with a solution of 33 parts of N-hydroxyethyl-n-ethyl-aminobenzene in 100 parts of water, 40 parts of 30% hydrochloric acid and 100 parts of ice. The formed dyestuff is filtered off, washed free of acid and dried. The new monazo dyestuff, when recrystallized from ethanol, forms violet rectangular leaves melting at 162–164°. It corresponds to the formula

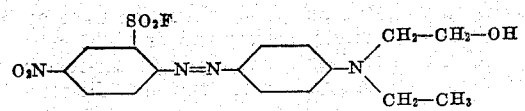

dissolves in ethanol with a violet coloration and dyes acetate silk in violet and synthetic polyamide fibers in bluish red shades.

*Example 3*

44 parts of 1-amino-4-nitrobenzene-2-sulfonic acid fluoride are diazotized as described in the preceding example and coupled in an anologous manner with 41 parts of 1-(N-hydroxyethyl - N - cyanoethyl) - amino-3-methylbenzene. The resulting dyestuff melts, recrystallized from ethanol, at 178–180° and corresponds to the formula

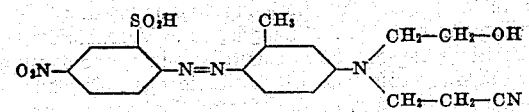

It dyes acetate silk in well dischargeable, reddish violet shades fast to light, washing, perspiration, gas fumes and sublimation.

*Example 4*

44 parts of 1-amino-4-nitrobenzene-2-sulfonic acid fluoride are diazotized as described in Example 2 and coupled in an analogous manner with 36 parts of 1-(N-hydroxyethyl-N-ethyl)-amino-3-methylbenzene. The resulting dyestuff melts, recrystallized from ethanol, at 189° and corresponds to the formula

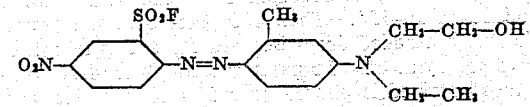

It dyes acetate silk in pure violet shades which are fast to light, washing, perspiration and sublimation and are well dischargeable.

*Example 5*

The procedure outlined in Example 2 is followed, except that the azo component is replaced by 45 parts of 1-(N,N-dihydroxyethyl)-amino-2-methoxy - 5 - methylbenzene. The thus obtained dyestuff, which corresponds to the formula

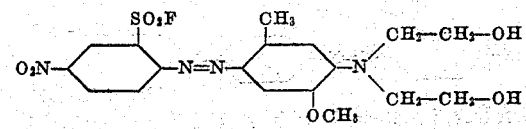

melts, when recrystallized from ethanol, at 168° and dyes acetate silk in well dischargeable violet shades fast to light, washing, perspiration and sublimation.

*Example 6*

The procedure outlined in Example 2 is followed, except that the azo component is replaced by 27 parts of 1-(N,N-dimethyl)-amino-3-methylbenzene. The thus obtained dyestuff which corresponds to the formula

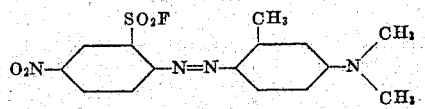

melts, when recrystallized from ethanol, at 222–225° and dyes acetate silk in violet shades.

*Example 7*

The procedure outlined in Example 2 is followed except that the azo component is replaced by 33 parts of 1-(N,N-diethyl)- amino-3-methylbenzene. The thus obtained dyestuff which corresponds to the formula

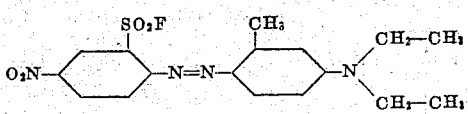

melts, when recrystallized from ethanol, at 192–194° and dyes acetate silk in violet shades.

*Example 8*

The procedure outlined in Example 2 is followed, except that the azo component is replaced by 39 parts of 1-(N-ethyl-N-cyanoethyl)-amino-3-methylbenzene. The thus obtained dyestuff which corresponds to the formula

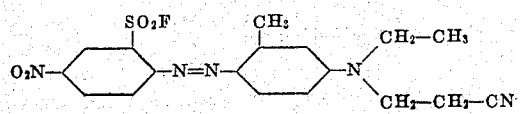

melts, when recrystallized from ethanol, at 227–229° and dyes acetate silk in reddish violet shades.

*Example 9*

The procedure outlined in Example 2 is followed, except that the azo component is replaced by 39 parts of 1 -(N - methoxyethyl - N - ethyl) - amino - 3 - methylbenzene. The thus obtained dyestuff, which corresponds to the formula

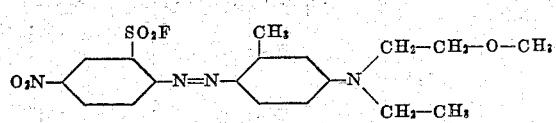

melts, when recrystallized from ethanol, at 168–170° and dyes acetate silk in violet shades.

*Example 10*

The procedure outlined in Example 2 is followed, except that the azo component is replaced by 42 parts of 1 - (N - 2',3' - dihydroxypropyl - N - ethyl) - amino - 3 - methylbenzene. The thus obtained dyestuff which corresponds to the formula

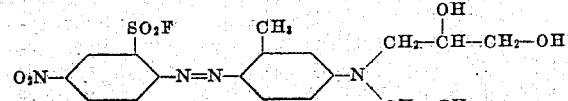

melts, when recrystallized from ethanol, at 189–190° and dyes acetate silk in violet shades.

*Example 11*

The procedure outlined in Example 2 is followed, except that the azo component is replaced by 48 parts of 1 - (N - hydroxyethyl - N - butyl) - amino - 2 - methoxy-5-methylbenzene. The thus obtained dyestuff which corresponds to the formula

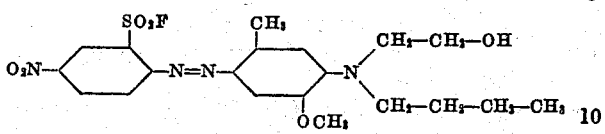

melts, when recrystallized from ethanol, at 62–66° and dyes acetate silk in reddish blue shades.

*Example 12*

The procedure outlined in Example 2 is followed, except that the azo component is replaced by 48 parts of 1 - (N,N - dihydroxyethyl) - amino - 3 - acetylaminobenzene. The thus obtained dyestuff which corresponds to the formula

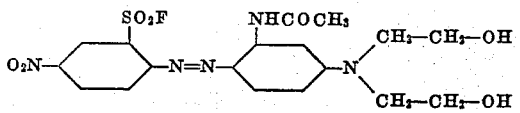

melts, when recrystallized from ethanol, at 190° and dyes acetate silk in violet shades which are fast to light, washing, perspiration, gas fumes and sublimation and are well dischargeable.

*Example 13*

The procedure outlined in Example 2 is followed, except that the azo component is replaced by 54 parts of 1 - (N,N - dihydroxyethyl) - amino - 2 - methoxy - 5-acetylaminobenzene. The thus obtained dyestuff which corresponds to the formula

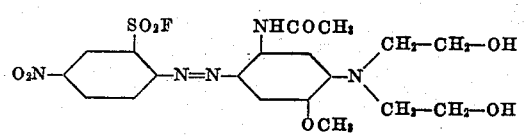

melts, when recrystallized from ethanol, at 204° and dyes acetate silk in greenish blue shades.

*Example 14*

The procedure outlined in Example 2 is followed, except that the azo component is replaced by 38 parts of N - hydroxyethyl - N - 2',2' - difluoroethyl - aminobenzene (dissolved in 80 parts of 30% hydrochloric acid without addition of water and ice). The thus obtained dyestuff which corresponds to the formula

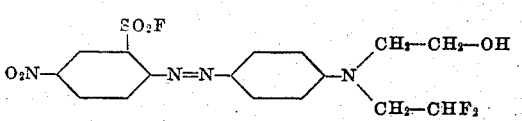

is soluble with a red coloration in ethanol and dyes acetate silk in red shades. It melts, when recrystallized from ethanol, at 163–165°.

*Example 15*

The procedure outlined in Example 2 is followed, except that the azo component is replaced by 41 parts of 1 - (N - hydroxyethyl - N - 2',2' - difluoroethyl) - amino-3-methyl-benzene (dissolved in 80 parts of 30% hydrochloric acid without addition of water and ice). The thus obtained dyestuff which corresponds to the formula

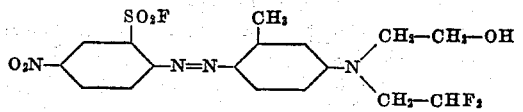

is soluble with a ruby coloration in ethanol and dyes acetate silk in ruby shades. It melts at 199° and forms longish redbrown lances when recrystallized from ethanol.

*Example 16*

The procedure outlined in Example 2 is followed, except that the azo component is replaced by 43 parts of 1 - (N,N - dihydroxyethyl) - amino - 3 - chlorobenzene. The thus obtained dyestuff which corresponds to the formula

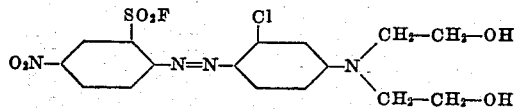

is soluble with a ruby coloration in ethanol and dyes acetate silk in reddish violet shades. It melts at 218–219° and forms long, very thin carmine needles when recrystallized from ethanol.

*Example 17*

The procedure outlined in Example 2 is followed, except that the azo component is replaced by 39 parts of 1 - (N,N - dihydroxyethyl) - amino - 3 - methylbenzene. The thus obtained dyestuff which corresponds to the formula

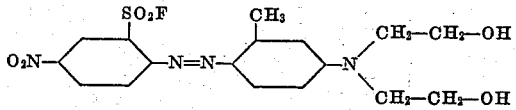

is soluble with a violet coloration in ethanol and dyes acetate silk in violet shades. It melts at 204–206° and forms violetbrown needles, when recrystallized from ethanol.

*Example 18*

17.5 parts of 1-amino-6-chloro-4-nitrobenzene-2-sulfonic acid fluoride are introduced at 60° into 180 parts of 95% sulfuric acid and, under stirring, diazotized by addition of 5 parts of dry sodium nitrite. Some time afterwards the solution is cooled down to 20° and poured onto 750 parts of ice and 250 parts of water. The excess of nitrous acid is destroyed by addition of aminosulfonic acid and then coupling is carried out with a solution of 16.5 parts of 1-(N,N-dihydroxyethyl)-amino-2-methoxy-5-methylbenzene in 10 parts of 30% hydrochloric acid and 100 parts of water. The new monoazo dyestuff which precipitates, is filtered, is washed free of acid and is dried. It dissolves in ethanol with a violet coloration and melts, recrystallized from ethanol, at 162–165°. The dyestuff corresponds to the formula

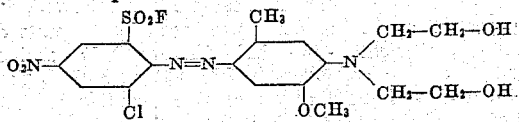

and dyes acetate silk in well dischargeable, violet shades fast to light, to washing and to sublimation.

*Examples 19–106*

In the following table further monoazo dyestuffs are recited which may be produced in an analogous manner as described in the foregoing examples. They correspond to the formula

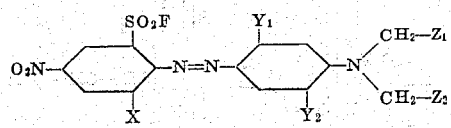

wherein $X$, $Y_1$, $Y_2$, $Z_1$ and $Z_2$ have the significances defined in the table. The term "color" represents the coloration of the dyestuff solution in ethanol.

| Example No. | X | $Y_1$ | $Y_2$ | $Z_1$ | $Z_2$ | Color |
|---|---|---|---|---|---|---|
| 19 | –H | –H | –H | –$CH_2$–OH | –$CH_2$–OH | Violet. |
| 20 | –H | –H | –H | –$C_4H_9$ | –$CH_2$–OH | Do. |
| 21 | –H | –H | –H | –$C_4H_8$–OH | –$CH_3$ | Do. |
| 22 | –H | –H | –H | –$CH_2$–CO–$NH_2$ | –$CH_3$ | Do. |
| 23 | –H | –H | –H | –H | –$CH_2$–OH | Do. |
| 24 | –H | –H | –H | –H | –H | Do. |
| 25 | –H | –H | –H | –$CH_3$ | –$CH_3$ | Do. |
| 26 | –H | –H | –H | –$CH_3$ | –$CH_2$–CN | Ruby. |
| 27 | –H | –H | –H | –$CF_3$ | –$CH_2$–OH | Red. |
| 28 | –H | –H | –H | –CH(OH)–$CH_2$–OH | –$CH_3$ | Violet. |
| 29 | –H | –$OCH_3$ | –H | –$CH_2$–OH | –$CH_2$–OH | Do. |
| 30 | –H | –$CH_3$ | –H | –$CH_2$–CO–$NH_2$ | –$CH_3$ | Do. |
| 31 | –H | –$CH_3$ | –H | –H | –$CH_2$–OH | Do. |
| 32 | –H | –$CH_3$ | –H | –CH(OH)–$CH_2$–OH | –H | Do. |
| 33 | –H | –$CH_3$ | –H | –CH($OCH_3$)–$CH_2$–OH | –$CH_3$ | Do. |
| 34 | –H | –$CH_3$ | –H | –CH(OH)–$CH_2$–$OCH_3$ | –$CH_3$ | Do. |
| 35 | –H | –$CH_3$ | –H | –$C_4H_8$–OH | –$CH_3$ | Bluish violet. |
| 36 | –H | –$CH_3$ | –H | –$C_4H_9$ | –$CH_2$–OH | Do. |
| 37 | –H | –$CH_3$ | –H | –$CF_3$ | –$CH_2$–OH | Ruby. |
| 38 | –H | –$CH_3$ | –H | –CO–$CH_3$ | –$CH_2$–OH | Do. |
| 39 | –H | –$CH_3$ | –H | –$CH_2$–CO–$CH_3$ | –$CH_2$–OH | Reddish violet. |
| 40 | –H | –$CH_3$ | –H | –CO–$CH_2$–$CH_3$ | –$CH_2$–OH | Ruby. |
| 41 | –H | –$CH_3$ | –H | –$SO_2$–$CH_3$ | –$CH_2$–OH | Do. |
| 42 | –H | –$CH_3$ | –H | –$SO_2$–$C_2H_5$ | –$CH_2$–OH | Do. |
| 43 | –H | –$CH_3$ | –H | –$CH_2$–$SO_2$–$CH_3$ | –$CH_2$–OH | Reddish violet. |
| 44 | –H | –$CH_3$ | –H | –$CH_2$–$SO_2$–$C_2H_5$ | –$CH_2$–OH | Do. |
| 45 | –H | –$CH_3$ | –H | –$CH_2$–O–CO–$CH_3$ | –$CH_3$ | Do. |
| 46 | –H | –$CH_3$ | –H | –$CH_2$–O–CO–$CH_3$ | –$CH_2$–O–CO–$CH_3$ | Do. |
| 47 | –H | –$CH_3$ | –H | –$CH_2$–O–CO–$C_2H_5$ | –$CH_3$ | Do. |
| 48 | –H | –$CH_3$ | –H | –$CH_2$–CO–O–$CH_3$ | –$CH_3$ | Do. |
| 49 | –H | –$CH_3$ | –H | –CO–O–$CH_3$ | –$CH_3$ | Ruby. |
| 50 | –H | –$CH_3$ | –H | –CO–O–$C_2H_5$ | –$CH_3$ | Do. |
| 51 | –H | –Cl | –H | –$CH_2$–OH | –$CH_2$–OH | Do. |
| 52 | –H | –Cl | –H | –$CH_2$–OH | –H | Do. |
| 53 | –H | –Cl | –H | –$CH_2$–OH | –$CH_2$–CN | Red. |
| 54 | –H | –Br | –H | –$CH_2$–OH | –$CH_2$–OH | Ruby. |
| 55 | –H | –Br | –H | –$CH_2$–OH | –$CH_3$ | Do. |
| 56 | –H | –Br | –H | –$CH_2$–OH | –H | Do. |
| 57 | –H | –Br | –H | –$CH_2$–OH | –$CH_2$–CN | Red. |
| 58 | –H | –$NHCOCH_3$ | –H | –$CH_2$–OH | –$CH_3$ | Violet. |
| 59 | –H | –$NHCOCH_3$ | –H | –$CH_2$–OH | –H | Do. |
| 60 | –H | –$NHCOCH_3$ | –H | –$CH_2$–OH | –$CH_3$ | Do. |
| 61 | –H | –$NHCOCH_3$ | –H | –CH(OH)–$CH_2$–OH | –H | Do. |
| 62 | –H | –$NHCOCH_3$ | –H | –CH(OH)–$CH_2$–OH | –$CH_2$–CN | Reddish violet. |
| 63 | –H | –$NHCOCF_3$ | –H | –$CH_2$–OH | –$CH_2$–OH | Violet. |
| 64 | –H | –$NHCOCF_3$ | –H | –CH(OH)–$CH_2OH$ | –$CH_3$ | Do. |
| 65 | –H | –$NHCOCF_3$ | –H | –CH(OH)–$CH_3$ | –CH(OH)–$CH_3$ | Do. |
| 66 | –H | –$CH_3$ | –$OCH_3$ | –$C_4H_8$–OH | –$CH_3$ | Reddish blue. |
| 67 | –H | –$CH_3$ | –$OCH_3$ | –CH(OH)–$CH_2OH$ | –$CH_3$ | Violet. |
| 68 | –H | –$CH_3$ | –$CH_3$ | –$CH_2$–OH | –$CH_2$–OH | Ruby. |
| 69 | –H | –$CH_3$ | –$OCH_3$ | –$CH_2$–OH | –$CH_3$ | Bluish violet. |
| 70 | –H | –$CH_3$ | –$OCH_3$ | –$CH_2$–OH | –H | Do. |
| 71 | –H | –$NHCOCH_3$ | –$OCH_3$ | –$CH_2$–OH | –$CH_3$ | Blue. |
| 72 | –H | –$NHCOCH_3$ | –$OCH_3$ | –$CH_2$–OH | –H | Do. |
| 73 | –H | –$NHCOCH_3$ | –$OCH_3$ | –CH(OH)–$CH_2$–OH | –$CH_3$ | Do. |
| 74 | –H | –$NHCOCH_3$ | –$OCH_3$ | –CH(OH)–$CH_2$–OH | –H | Do. |
| 75 | –H | –$NHCOCF_3$ | –$OCH_3$ | –$CH_2$–OH | –$CH_2$–OH | Do. |
| 76 | –H | –$NHCOCF_3$ | –$OCH_3$ | –CH(OH)–$CH_2$–OH | –$CH_3$ | Do. |
| 77 | –H | –$NHCOCF_3$ | –$OCH_3$ | –CH(OH)–$CH_3$ | –CH(OH)–$CH_3$ | Do. |
| 78 | –H | –$NHCOCH_3$ | –O–$C_2H_5$ | –$CH_2$–OH | –$CH_2$–OH | Do. |
| 79 | –H | –$NHCOCH_3$ | –O–$C_2H_5$ | –CH(OH)–$CH_2$–OH | –$CH_3$ | Do. |
| 80 | –H | –$NHCOCF_3$ | –O–$C_2H_5$ | –$CH_2$–OH | –$CH_2$–OH | Do. |
| 81 | –H | –$NHCOCF_3$ | –O–$C_2H_5$ | –CH(OH)–$CH_2$–OH | –$CH_3$ | Do. |
| 82 | –Cl | –H | –H | –$CH_2$–OH | –$CH_2$–CN | Reddish brown. |
| 83 | –Cl | –H | –H | –$CH_2$–OH | –$CH_3$ | Violet brown. |
| 84 | –Cl | –$CH_3$ | –H | –$CH_2$–OH | –$CH_3$ | Brownish violet. |
| 85 | –Cl | –$CH_3$ | –H | –$CH_2$–OH | –$CH_2$–OH | Do. |
| 86 | –Cl | –$CH_3$ | –H | –CH(OH)–$CH_2OH$ | –$CH_3$ | Do. |
| 87 | –Cl | –$CH_3$ | –H | –$CH_2$–OH | –$CH_2$–CN | Brownish red. |
| 88 | –Cl | –$CH_3$ | –$OCH_3$ | –$C_3H_7$ | –$CH_2$–OH | Violet. |
| 89 | –Cl | –$NHCOCH_3$ | –$OCH_3$ | –$CH_2$–OH | –$CH_3$ | Blue gray. |
| 90 | –Br | –$CH_3$ | –H | –$CH_2$–OH | –$CH_2$–OH | Brownish violet. |
| 91 | –Br | –$CH_3$ | –H | –$CH_2$–OH | –$CH_2$–OH | Do. |
| 92 | –Br | –$CH_3$ | –$OCH_3$ | –$CH_2$–OH | –$CH_2$–OH | Violet. |
| 93 | –Br | –$CH_3$ | –$OCH_3$ | –$C_3H_7$ | –$CH_3$ | Do. |
| 94 | –F | –$CH_3$ | –H | –$CH_2$–OH | –$CH_2$–OH | Brownish violet. |
| 95 | –F | –$CH_3$ | –H | –$CH_2$–OH | –$CH_2$–OH | Do. |
| 96 | –F | –$CH_3$ | –H | –$CH_2$–OH | –$CH_2$–OH | Do. |
| 97 | –F | –$CH_3$ | –H | –$C_3H_7$ | –$CH_3$ | Reddish brown. |
| 98 | –$OCH_3$ | –$CH_3$ | –H | –$CH_2$–OH | –$CH_2$–OH | Violet. |
| 99 | –$OCH_3$ | –$CH_3$ | –$OCH_3$ | –$CH_2$–OH | –$CH_2$–OH | Blue. |
| 100 | –$OCH_3$ | –$NHCOCH_3$ | –$OCH_3$ | –$CH_2$–OH | –$CH_3$ | Brownish violet. |
| 101 | –$CF_3$ | –$CH_3$ | –H | –$CH_2$–OH | –$CH_2$–OH | Do. |
| 102 | –$CF_3$ | –$CH_3$ | –H | –$CH_2$–OH | –$CH_2$–OH | Violet. |
| 103 | –$CF_3$ | –$CH_3$ | –$OCH_3$ | –$CH_2$–OH | –$CH_2$–OH | Do. |
| 104 | –$CF_3$ | –$CH_3$ | –$OCH_3$ | –$C_3H_7$ | –$CH_2$–OH | Brownish ruby. |
| 105 | –$CH_3$ | –$CH_3$ | –H | –$CH_2$–OH | –$CH_2$–OH | Ruby. |
| 106 | –H | –$CH_3$ | –H | –CN | –$CH_2$–OH | |

Example 107

10 parts of the dyestuff according to Example 12 are well ground together with 10 parts of a dispersing agent and 5 parts of sodium sulfate, whereupon this mixture is added to a dyeing bath containing 10,000 parts of water at 45°. When the dyestuff is well dispersed, 30,000 parts of water are added to the bath and dyeing of 1000 parts of acetate silk is started at 50°. The temperature is elevated preferably up to 80° and dyeing is continued for about 1 hour. The material is then soaped, washed, rinsed and dried. The shade thus obtained is a pure violet possessing very good fastness to light, washing, perspiration, gas fumes and sublimation. The dyeings are well dischargeable.

Example 108

10 parts of the dyestuff of Example 1 are dispersed in a mixture of 9000 parts of ethanol and 3000 parts of water at 25°. 1000 parts of acetate silk are then dyed in this solution for about 30 minutes at 25°, washed, soaped, washed again and dried. The shade thus obtained is a pure ruby possessing very good fastness to light, washing, perspiration, gas fumes and sublimation. The dyeings are well dischargeable.

Example 109

In an analogous manner to that described in Example 107, 1000 parts of nylon polyamide fibers are dyed. The temperature is preferably elevated up to the boil. The shade thus obtained is a pure ruby of good fastness to washing and sublimation.

Having thus disclosed the invention, what is claimed is:

1. A monoazo dyestuff which corresponds to the formula

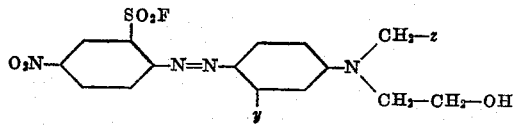

wherein y stands for a member selected from the group consisting of hydrogen, chlorine, bromine and lower alkyl and wherein z stands for a member selected from the group consisting of hydrogen, lower alkyl, lower hydroxyalkyl, lower cyanoalkyl, lower difluoroalkyl and lower polyfluoroalkyl.

2. The monoazo dyestuff which corresponds to the formula

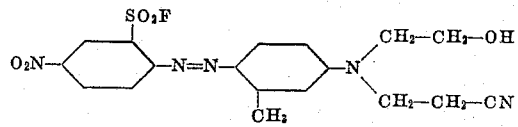

3. The monoazo dyestuff which corresponds to the formula

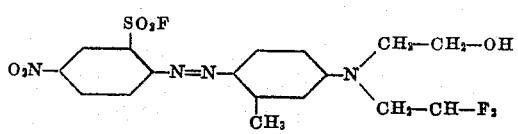

4. The monoazo dyestuff which corresponds to the formula

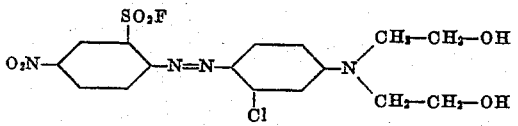

5. The monoazo dyestuff which corresponds to the formula

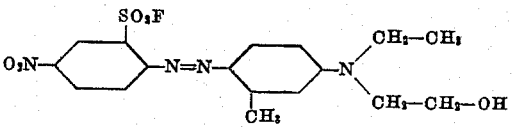

6. The monoazo dyestuff which corresponds to the formula

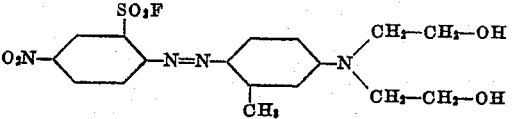

References Cited in the file of this patent
UNITED STATES PATENTS

| | | |
|---|---|---|
| 2,154,186 | Schweitzer et al. | Apr. 11, 1939 |
| 2,576,037 | Parker et al. | Nov. 20, 1951 |

UNITED STATES PATENT OFFICE
Certificate of Correction

Patent No. 2,830,043

April 8, 1958

Ernst Merian

It is hereby certified that error appears in the printed specification of the above numbered patent requiring correction and that the said Letters Patent should read as corrected below.

Column 1, line 64, for "dihdroxyethyl" read —dihydroxyethyl—; column 3, line 12, for "N-hydroxyethyl-n-ethyl-amino-" read —N-hydroxyethyl-N-ethyl-amino- —; lines 36 to 39, Example 3, the left-hand portion of the formula should appear as shown below instead of as in the patent—

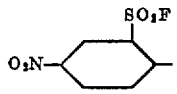

Signed and sealed this 26th day of August 1958.

[SEAL]

Attest:
KARL H. AXLINE,
*Attesting Officer.*

ROBERT C. WATSON,
*Commissioner of Patents.*